United States Patent [19]

Affa

[11] Patent Number: 5,655,311

[45] Date of Patent: Aug. 12, 1997

[54] POSITION MEASURING DEVICE

[75] Inventor: Alfred Affa, Stein/Traun, Germany

[73] Assignee: Dr. Johannes Heidenhain GmbH, Traunreut, Germany

[21] Appl. No.: 397,434

[22] Filed: Mar. 1, 1995

[30] Foreign Application Priority Data

Mar. 2, 1994 [DE] Germany ................. 44 06 799.2

[51] Int. Cl.[6] ..................................................... G01B 11/04
[52] U.S. Cl. ................................................. 33/706; 33/702
[58] Field of Search ........................... 33/700, 702, 703, 33/704, 706, 707, 708

[56] References Cited

U.S. PATENT DOCUMENTS

| | | | |
|---|---|---|---|
| 4,198,757 | 4/1980 | Nelle et al. | 33/706 |
| 4,320,578 | 3/1982 | Ernst | 33/706 |
| 4,492,033 | 1/1985 | Ichikawa | 33/706 |
| 4,586,760 | 5/1986 | Welker . | |
| 4,776,098 | 10/1988 | Nelle | 33/702 |
| 4,912,856 | 4/1990 | Ernst | 33/702 |
| 5,065,525 | 11/1991 | Szenger | 33/702 |
| 5,115,573 | 5/1992 | Rieder et al. | 33/707 |
| 5,157,846 | 10/1992 | Fromme | 33/704 |
| 5,375,338 | 12/1994 | Nelle | 33/702 |

FOREIGN PATENT DOCUMENTS

| | | |
|---|---|---|
| 0 110 059 | 10/1983 | European Pat. Off. . |
| 0 264 801 | 10/1987 | European Pat. Off. . |
| 294563 | 12/1988 | European Pat. Off. ............... 33/702 |
| 025 05 587 | 8/1976 | Germany . |
| 35 09 390 | 11/1985 | Germany . |

OTHER PUBLICATIONS

Patent Abstracts of Japan, P-493, vol. 10/No. 256, Sep. 2, 1986.

*Primary Examiner*—G. Bradley Bennett
*Attorney, Agent, or Firm*—Brinks Hofer Gilson & Lione

[57] ABSTRACT

A position measuring device for measuring the relative position of a first object and a second object. The position measuring device having a support body having a measuring representation, wherein the support body is attached to the first object by a translatory seating. A scanning device that scans the measuring representation along a measuring direction X, wherein the scanning device is attached to the second object. The translatory seating having an elastic adhesive layer extending in the measuring direction (X) and positioned between the support body and the first object so that a translatory distance compensation between the support body and the first object is made possible.

30 Claims, 9 Drawing Sheets

POSITION MEASURING DEVICE

POSITION MEASURING DEVICE

Applicant claims, under 35 U.S.C. §119, the benefit of priority of the filing date of Mar. 2, 1994, of a German application, copy attached, Ser. No. P 44 06 799.2, filed on the aforementioned date, the entire contents of which are incorporated herein by reference.

FIELD OF THE INVENTION

The invention relates to a position measuring device for measuring the relative position of two objects. A support body with a measuring representation is fastened to a first object which is scanned by a scanning device. The scanning device is fastened to the other object, wherein a translatory distance compensation between the support body and the first object is made possible.

BACKGROUND OF THE INVENTION

Such position measuring devices are employed for measuring the relative position of two components of a machine tool or a coordinate measuring machine.

A linear measuring device is known from German Patent Publication DE 25 05 587 C3, wherein the ends of a graduation support are suitably fastened to one of the components by hinge-like embodied fastening elements.

A similarly designed linear measuring device is described in European Patent Publication EP 0 110 059 B1. Elastic fastening means are provided on the ends and a rigid fastening element in the center of the housing. Fastening is done by means of a highly elastic adhesive layer in order to additionally prevent measuring inaccuracies in case of different coefficients Of expansion between the measurement representation and the support body.

In accordance with European Patent Publication EP 0 264 801 A1, the measurement representation is seated on spheres for linear compensation.

The linear measuring device in accordance with German Patent Publication DE 35 09 390 A1—on which the instant invention is based—has elastic fastening elements at the ends of the housing and further fastening elements located between them. These further fastening elements are fastening elbows which are clamped to the housing by means of sliding blocks engaging a groove. Elastic intermediate layers are intended to allow a translatory movement between the housing and the fastening elbows. However, it is disadvantageous that a tension-free connection cannot be made because of the screw fastening. It is impossible in actuality to tighten the screws with the sliding blocks evenly, so that different forces act on the housing at the individual fastening locations, which in turn can result in measurement errors.

In view of the above-review of the state of the art, it is an object of the present invention to provide a position measuring device wherein uneven thermal properties of the support body and the object to be measured and on which the support body is fastened cannot practically cause any falsification of the measured results.

It is another object of the present invention to provide a support body which is fastened relatively free of tension, yet which is stable.

Another object of the present invention is to provide simple and space-saving fastening.

SUMMARY OF THE INVENTION

The present invention regards a position measuring device for measuring the relative position of a first object and a second object. The position measuring device has a support body having a measuring representation, wherein the support body is attached to the first object by a translatory seating. A scanning device that scans the measuring representation along a measuring direction X, wherein the scanning device is attached to the second object. The translatory seating has an elastic adhesive layer extending in the measuring direction (X) and positioned between the support body and the first object so that a translatory distance compensation between the support body and the first object is made possible.

The present invention provides an advantage in that an almost unimpeded linear expansion between the support body and the object to be measured can take place.

Another advantage of the present invention is that stable and oscillation-free fastening is assured.

Another advantage of the present invention is that it provides a simple and space-saving construction.

Examples of the present invention will be described in detail by means of the drawings.

DETAILED DESCRIPTION OF THE EMBODIMENTS

Figure 1:
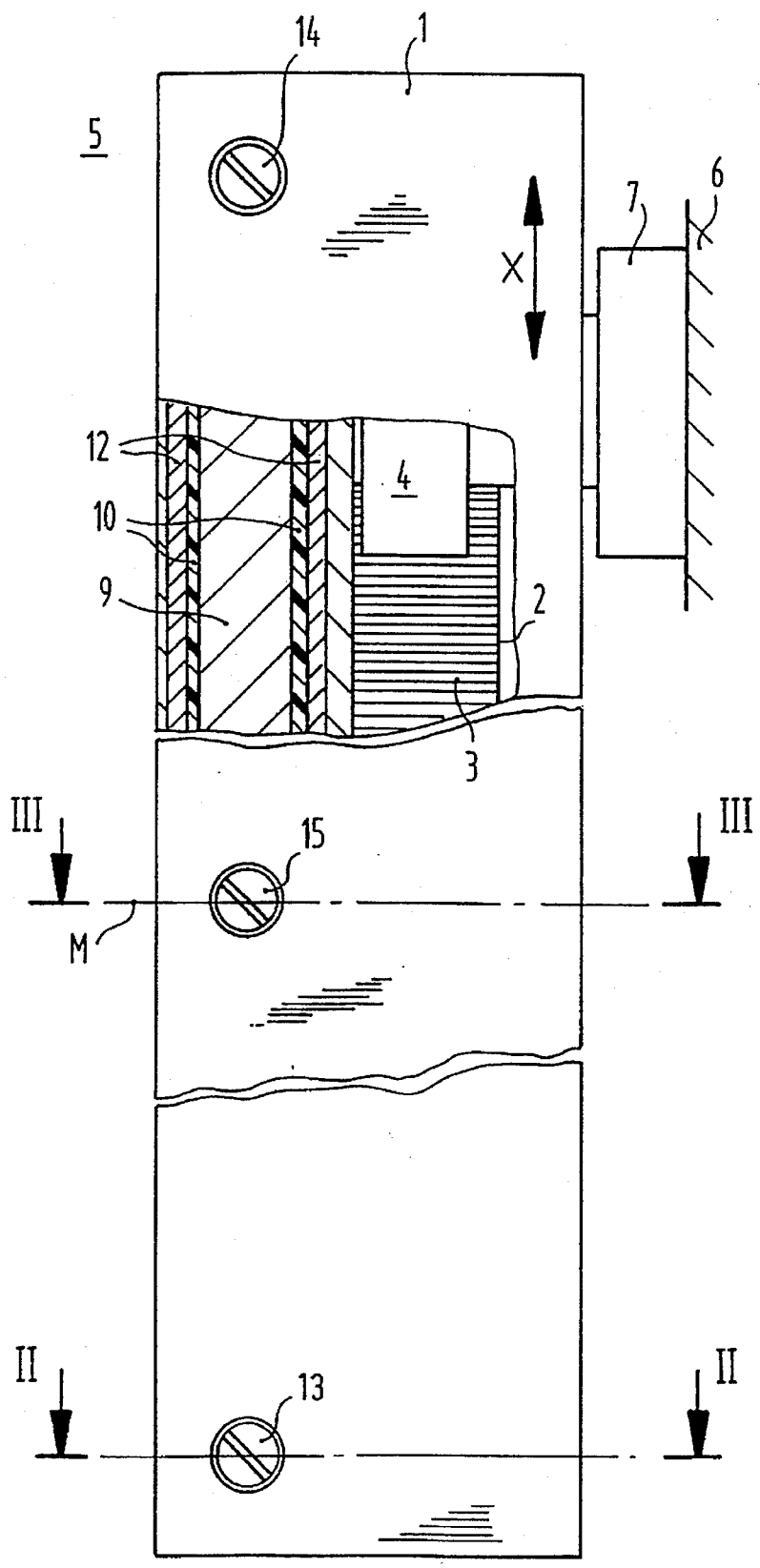
FIG. 1 is a partially cut-away view of an embodiment of a linear measuring device according to the present invention.

An encapsulated linear position measuring device for measuring the relative position between two objects is shown in FIG. 1. The measuring device has housing 1 constituting a support body having measurement representation or scale 2, with graduation 3 applied thereto. Measurement representation 2 is photoelectrically scanned along a measuring direction X by scanning device 4. Housing 1 is a hollow chamber made of aluminum, in whose interior measurement representation 2 made of glass is fastened. Housing 1 is attached to object 5 and scanning device 4 is attached via fixture 7 to the other object 6 to measure the relative movement between the two objects 5, 6. For example, one object may be carriage 5 and the other object may be bed 6 of a machine tool.

Measurement representation 2 is attached to an interior surface of housing 1 by means of an elastic attachment device, such as elastic adhesive layer 8, which is interposed between measuring representation 2 and housing 1. The elastic attachment device causes the translatory seating or expansion of measurement representation 2 in response to temperature changes to be uniform along the entire measurement length. Thus, an increase in the ambient temperature results in measurement representation 2 expanding uniformly in all directions, starting at the center M.

A fastening element, such as rail 9 which is made of steel, is provided for fastening housing 1 to a surface of carriage 5 via a translatory seating. It is already known from German Patent Publication DE 23 49 944 C3 and U.S. Pat. No. 4,586,760 to fasten the housing via a rail. With these known linear measuring devices the connection between the housing and the rail is made by means of screws, because of which distortions of the housing occur and no free linear expansion between the rail and the housing is possible in case of temperature changes. In contrast to this, in accordance with the present invention a translatory seating is provided which is rigidly fastened to carriage 5 via a highly elastic adhesive layer 10 extending in the measuring direction X. Elastic adhesive layer 10 is interposed or positioned between housing 1 and carriage 5 so that a translatory distance compensation between housing 1 and carriage 5 is possible.

Rail 9 is glued onto a projection or into groove 11 of housing 1 which extends over the entire length of housing 1 along the measuring direction X. Preferably this is accomplished by placing elastic adhesive layer 10 between at least one surface of the projection or groove 11 that extends in the measuring direction X and a surface of rail 9 so that rail 9 is fastened with a degree of translatory freedom.

Figure 2:
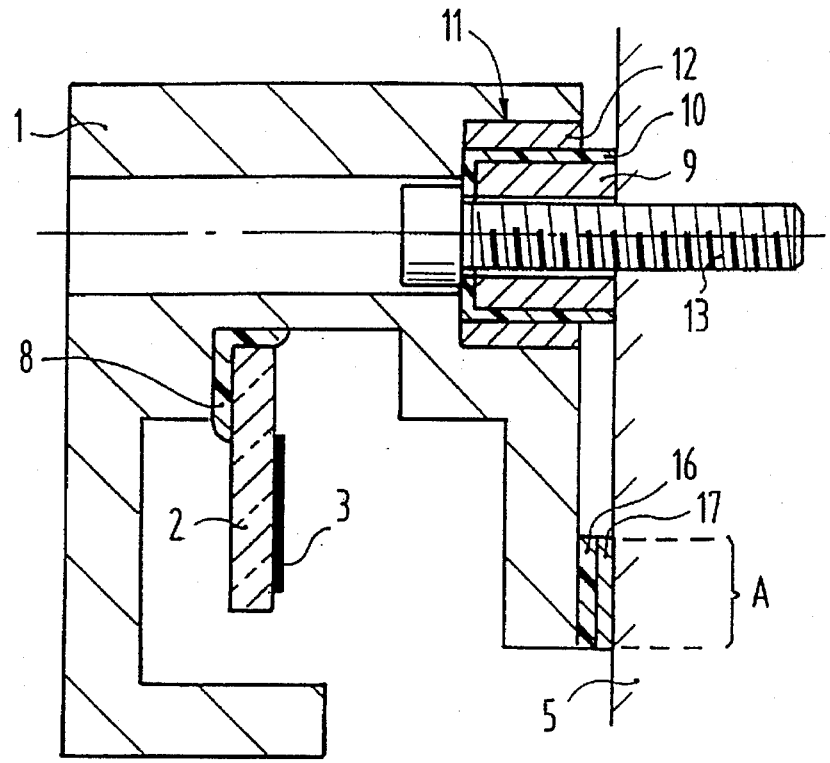
FIG. 2 shows a cross section through the linear measuring device of FIG. 1 taken along the line II—II.
Figure 3:
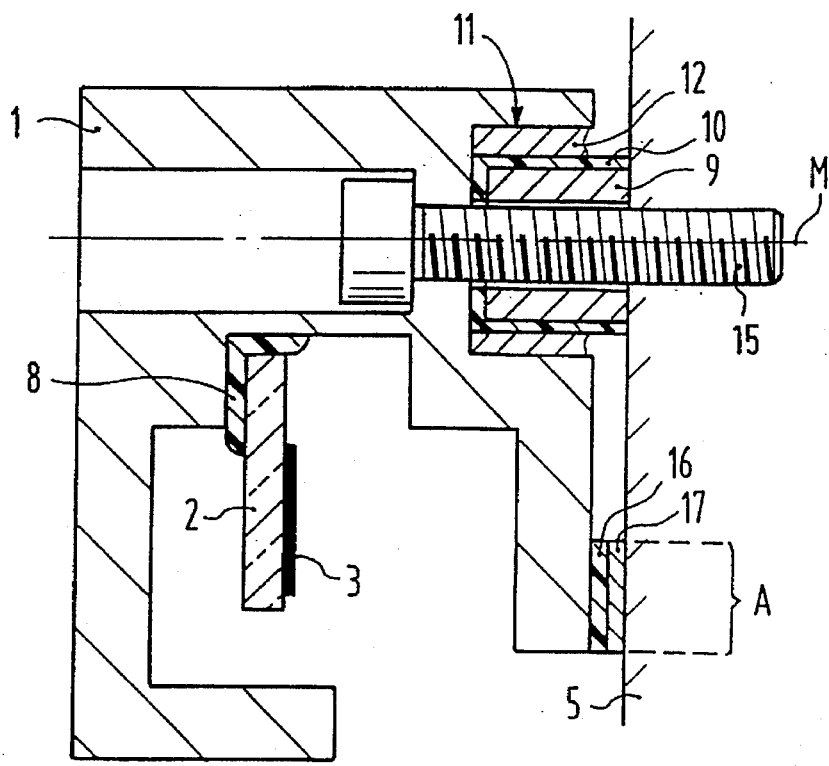
FIG. 3 is a further cross section through the linear measuring device of FIG. 1 taken along the line III—III.

As shown in FIGS. 2–3, rail 9 and the lateral surface of the projection or groove 11 of housing 1 define a gap extending in the measuring direction X. In order to make the connection between housing 1 and carriage 5 especially stable and oscillation-free, a relatively solidly or inelastically curing casting compound 12 and adhesive layer 10 are inserted in the gap. Casting compound 12 is inserted in the gap between adhesive layer 10 on the lateral surfaces of rail 9 and the lateral surfaces of the projection or groove 11. Adhesive layer 10 has a continuously even thickness of approximately 0.1 mm, which assures the same properties over the entire housing length. Rail 9 is securely screwed to carriage 5 by means of screws 13 and 14. To obtain a stable reference mark for measurement in the center M of housing 1, screw 15 is disposed at this location M, by means of which housing 1 is rigidly connected with rail 9 and, thus, rigidly with carriage 5. This connection is shown in detail in FIG. 3. With a small and therefore lightweight housing 1, screw 15 can be omitted and replaced by a connection shown in FIG. 2. In this case a measurement reference point necessarily results in the center M of housing 1, from which housing 1 can expand symmetrically in the measuring direction X during temperature changes.

As shown in FIGS. 2 and 3, housing 1 is supported on a surface of carriage 5 to further increase the oscillation resistance. A further adhesive layer 16 is provided on this support surface A and is covered by a sliding surface 17 resting on the surface of carriage 5. By means of this step the unhampered linear expansion between housing 1 and carriage 5 is also assured on the support surface A. It is also possible to apply another elastic layer to support surface A. Also, only one adhesive layer can be provided on the support surface A.

In the following examples in accordance with FIG. 4 to FIG. 9, rail 9 is embodied to be dovetailed, instead of rectangular as in FIGS. 2–3, which improves the interlocking between housing 1 and rail 9. In the embodiments of FIGS. 4–9, the projection or groove 11 housing 1 is undercut to resemble the shape of rail 9. Furthermore, rail 9 and the lateral surface of the projection or groove 11 of housing 1 define a gap extending in the measuring direction X. It is understood that other groove or projection shapes with undercuts are also conceivable.

Figure 4:
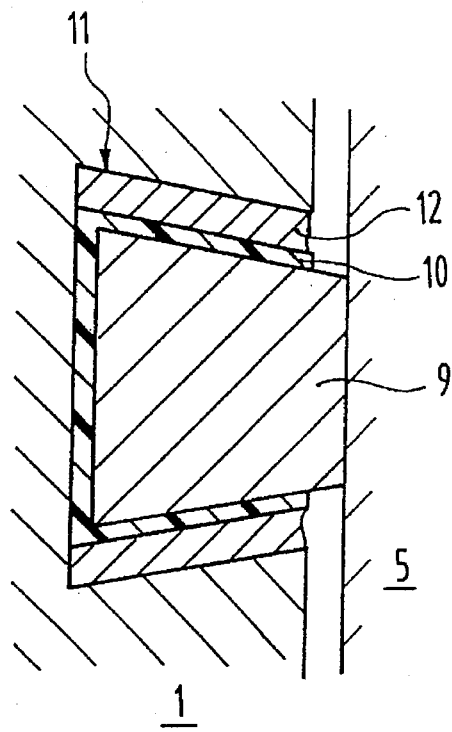
FIGS. 4 to 13 show cross-sectional views of ten embodiments of fastenings to be used with a linear measuring device according to the present invention.

In FIG. 4, rail 9 is fixed in place by adhesive layer 10 on the bottom of the dovetail-shaped groove 11 of housing 1. Casting compound 12 is applied directly to the two surfaces of groove 11 that face each other. Adhesive layer 10 is then applied to the lateral faces of the rail and acts as a separating layer between the rail and casting compound 12. Rail 9 is fastened in a clamped manner by means of casting compound 12, wherein a translatory expansion of rail 9 is made possible by means of thin adhesive layer 10 without creating forces which could cause measurement errors acting on housing 1. These translatory movements are compensated in adhesive layer 10.

Figure 5:
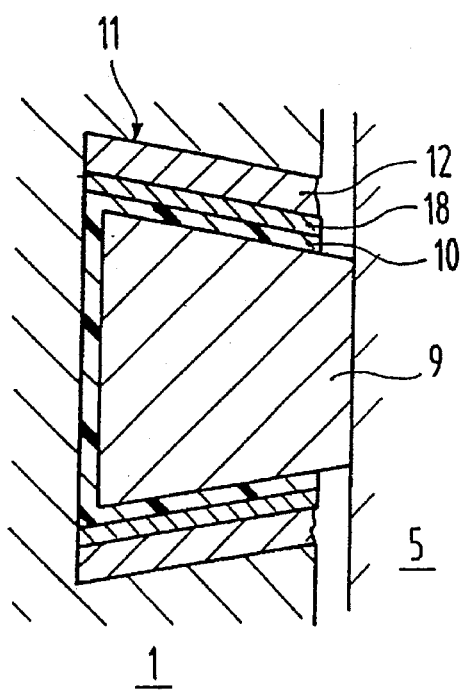

To make the fastening of FIG. 4 even more free of compulsive forces and more flexible in the linear direction, sliding layer 18 is provided between adhesive layer 10 and casting compound 12, as seen in FIG. 5. Sliding layer 18 can be a Teflon foil or an oil-containing paper. It is particularly advantageous to employ an adhesive foil wherein the protective paper is used as the sliding layer. Sliding layer 18 can also be provided in place of or additionally between adhesive layer 10 and the lateral surface of groove 11 or lateral surface of rail 9 of FIG. 5.

Figure 6:
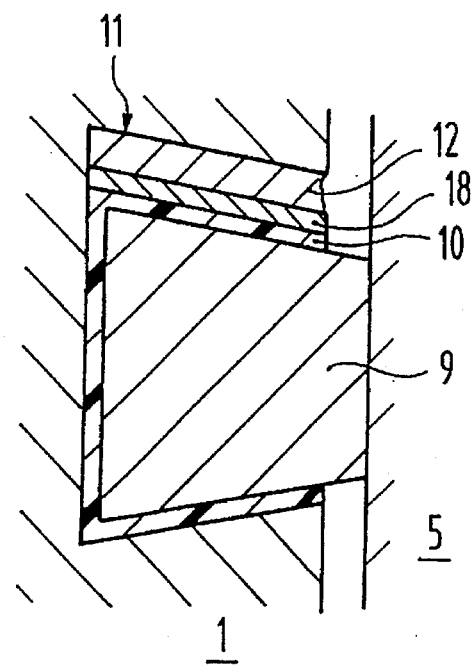

As seen in FIG. 6, rail 9 is fixed in place on the bottom and on one lateral surface of groove 11 by means of adhesive layer 10. The further lateral surface of rail 9 is also provided with adhesive layer 10 and sliding layer 18. Clamping of rail 9 in groove 11 takes place by inserting a rigidly or inelastically curing casting compound 12 into the free space between sliding layer 18 and the further lateral surface of groove 11.

Figure 7:
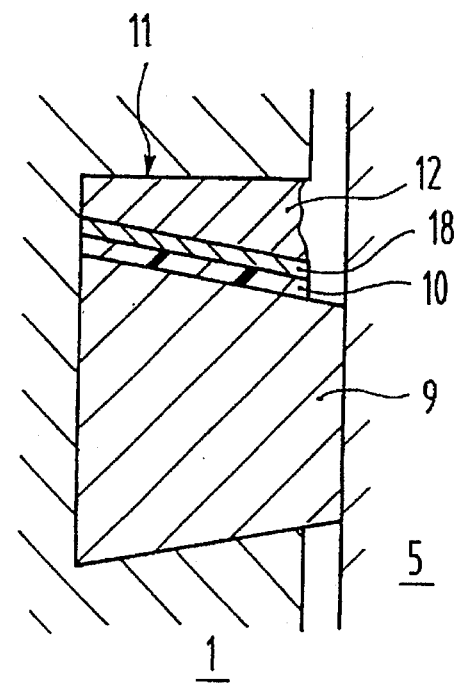

In accordance with FIG. 7, rail 9 rests slidingly on the bottom and one lateral face of groove 11. The further lateral surface of rail 9 is provided with an adhesive foil consisting of adhesive layer 10 and sliding layer 18. Casting compound 12 is inserted between sliding layer 18 and the further lateral surface of groove 11.

Figure 8:
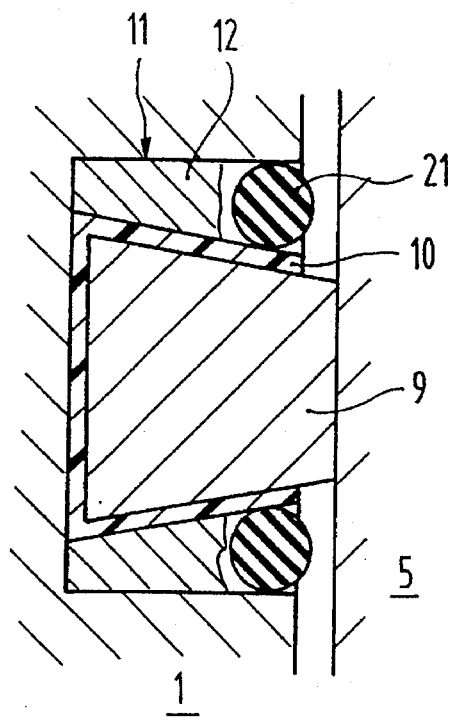

Fastening of rail 9 of FIG. 8 is similar to that of FIG. 4. Rectangular groove 11 is provided in place of the dovetail-shaped groove 11 of FIG. 4. Furthermore, sealing elements 21 are positioned to cover the gap so that casting compound 12 is protected against environmental effects.

Figure 9:
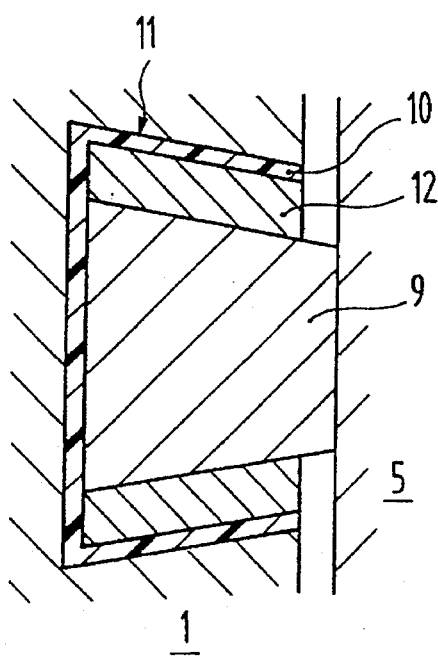

In the examples up to now the separating layer was provided in the form of adhesive layer 10, or adhesive layer 10 plus sliding layer 18, between one surface of rail 9 and casting compound 12. As shown in FIG. 9, separating layers 10, 18 can also be located between casting compound 12 and a lateral surface of housing groove 11. To further increase the translatory mobility it is possible to also provide separating layers between rail 9 and casting compound 12 and additionally between casting compound 12 and housing groove 11. The separating layer may be comprised solely of adhesive layer 10 or sliding layer 18 or comprise adhesive layer 10 and sliding layer 18 in combination.

Figure 10:
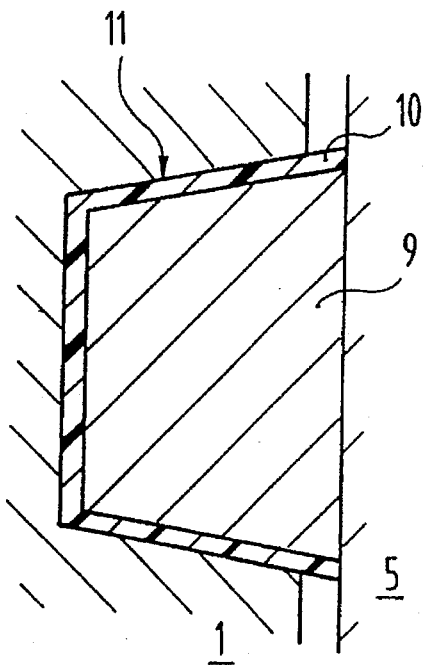

FIG. 10 shows that the fastening between housing 1 and rail 9 is also possible exclusively by means of adhesive layer 10. Linear expansions between housing 1 and rail 9 and therefore also between housing 1 and carriage 5 can be compensated by means of the inherent flexibility of adhesive layer 10.

Figure 11:
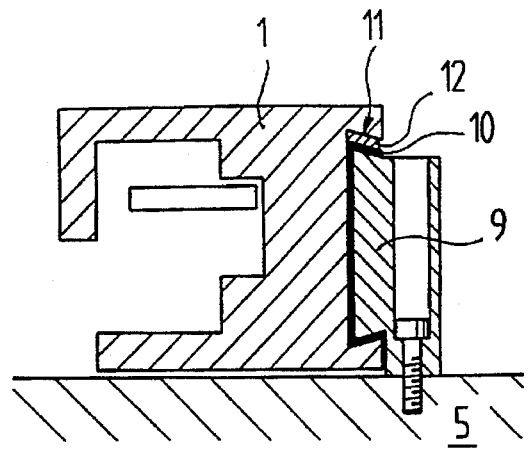

To further simplify mounting of rail 9, rail 9 of FIG. 11 extends out of housing 1 at least in the areas intended for its fastening with carriage 5. Bores are provided in these areas, through which rail 9 can be rigidly screwed to carriage 5 by the user. A dovetail-shaped projection of rail 9 itself interlockingly engages a groove 11 of housing 1. In accordance with the invention, a highly elastic thin adhesive layer 10 is provided between the inner surfaces of groove 11 and the surfaces of rail 9. The remaining space may be filled with casting compound 12 and/or sliding layer 18 as described in FIGS. 2 to 9.

Figure 12:
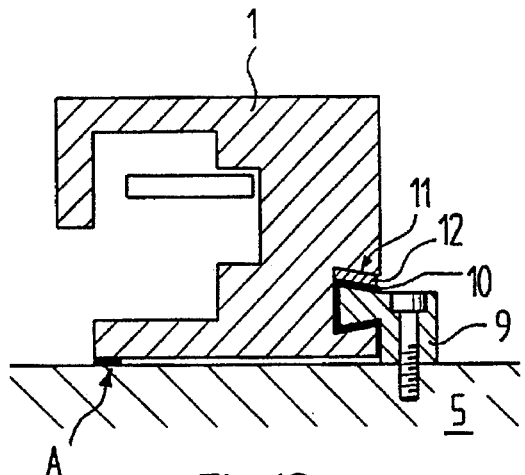

If, for easier manipulation the width of rail 9 is selected to be less, it is advantageous that housing 1 is additionally supported in a support area A. This exemplary embodiment is represented in FIG. 12. As in FIG. 11, a dovetail-shaped projection of rail 9 interlockingly engages groove 11 of housing 1. A highly elastic thin adhesive layer 10 is provided between the inner surfaces of groove 11 and the surfaces of rail 9. The remaining space may be filled with casting compound 12 and/or sliding layer 18 as described in FIGS. 2 to 9. One embodiment of the support area A is shown in detail in FIGS. 2 and 3.

Figure 13:
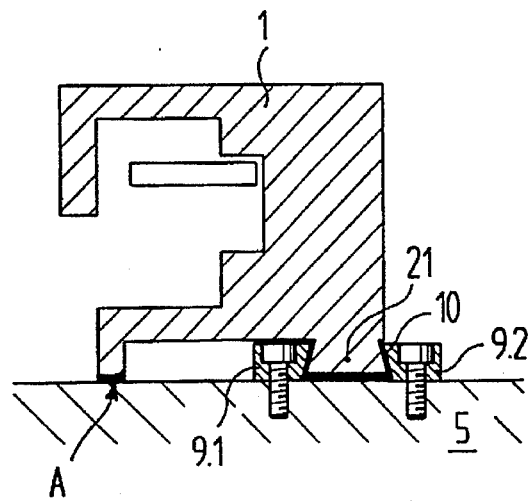

FIG. 13 shows an example of how an interlocking fastening between housing 1 and carriage 5 can be realized without the use of casting compound 12. Housing 1 has a dovetail-shaped projection 21 extending in the measuring direction X. Two rails 9.1 and 9.2 interlockingly engage both long sides of projection 21. Rafts 9.1 and 9.2 are rigidly fastened on carriage 5 via screws, while elastic adhesive layer 10 is provided between the surfaces of projection 21 of housing 1 and the surfaces of rails 9.1 and 9.2 for the translatory seating of housing 1. It is possible to provide a space or a further adhesive layer 10 to prevent friction between the surface of projection 21 facing carriage 5 and carriage 5 itself. It can be seen from the examples that a simple and space-saving mounting is made possible by the use of a long continuous fastening rail 9 and integrating it into housing 1.

Figure 14:
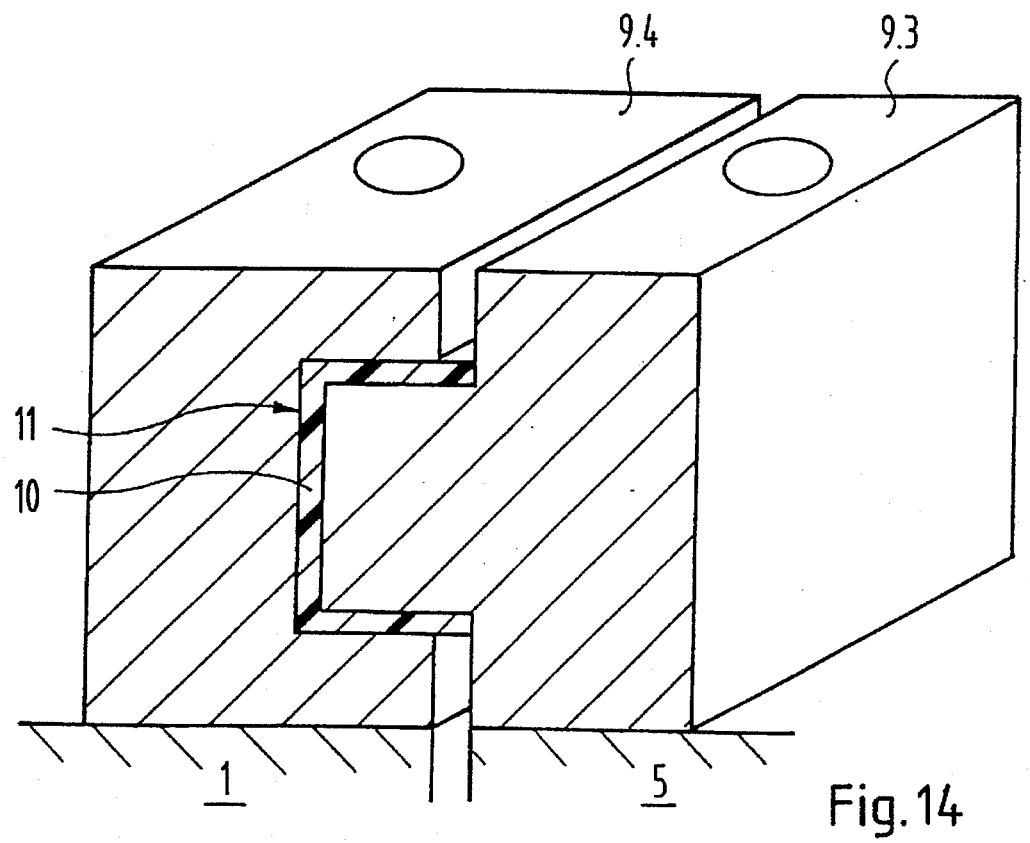
FIG. 14 shows an embodiment of a separate fastening element according to the present invention.

As illustrated in FIG. 14, it is also possible to replace the integrated rail of FIGS. 1–13 with a rail 9.3 which is connected longitudinally displaceable with respect to a further rail 9.4 on housing 1. Rail 9.3 is fastened rigidly to carriage 5 and rail 9.4 rigidly to housing 1, for example by screwing. An elastic adhesive layer 10 is shown as an example of a connection, elastic in the long measuring direction X, between the one rail 9.3 and the other rail 9.4. It is of course also possible for the already described layers and layer combinations as well as shapes of groove 11 to be used here as shown in FIGS. 2–10.

The embodiment of FIG. 14 has the advantage that linear measuring devices already in use can be retrofitted in a particularly simple manner. Because rail 9.4 is rigidly fastened on housing 1, when installed it is also an integral part of housing 1.

Figure 17:
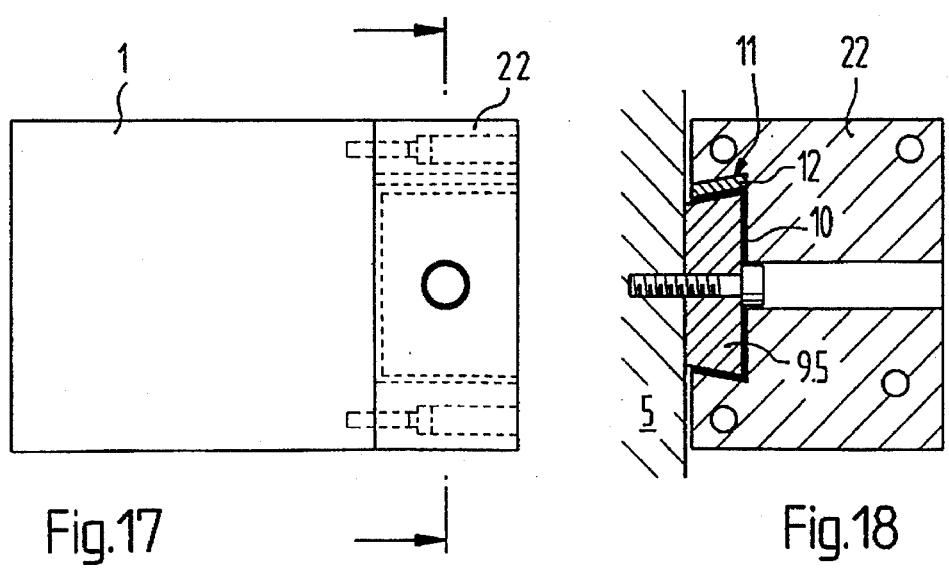
Figure 18:
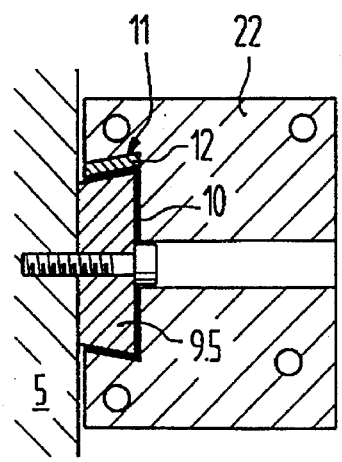
Figure 19:
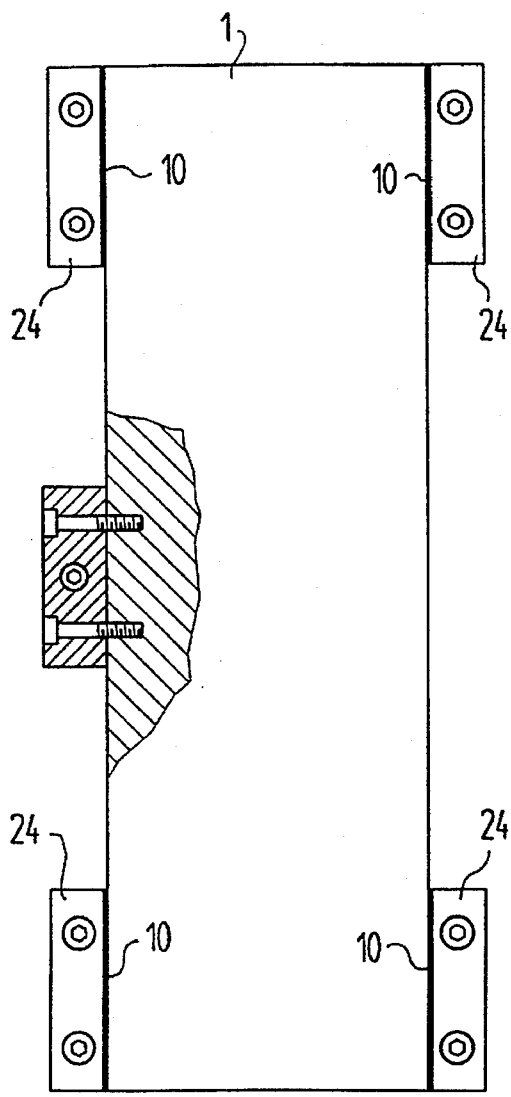
FIGS. 19 to 22 show further embodiments of linear measuring devices according to the present invention.
Figure 21:
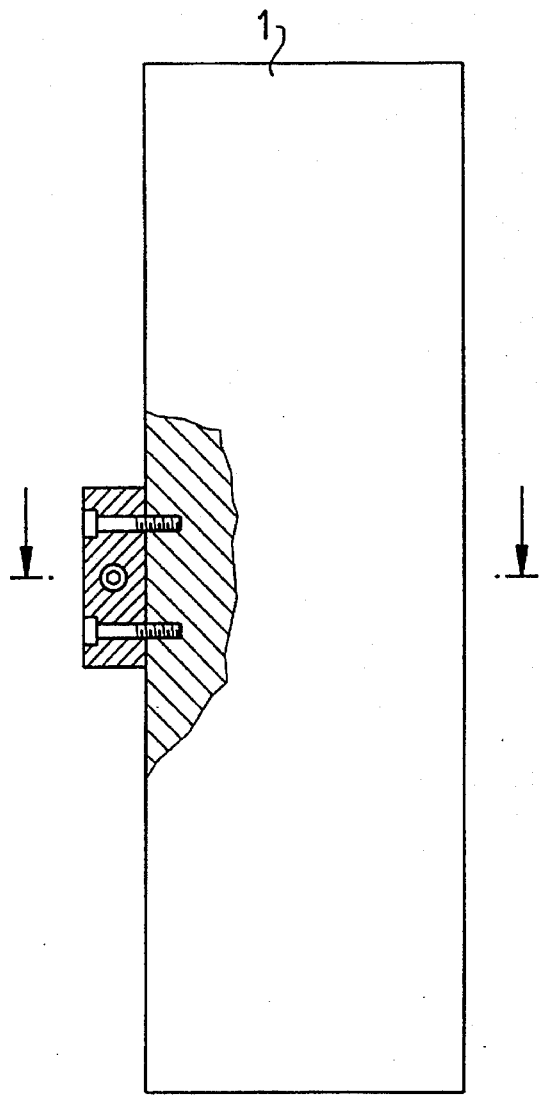
Figure 20:
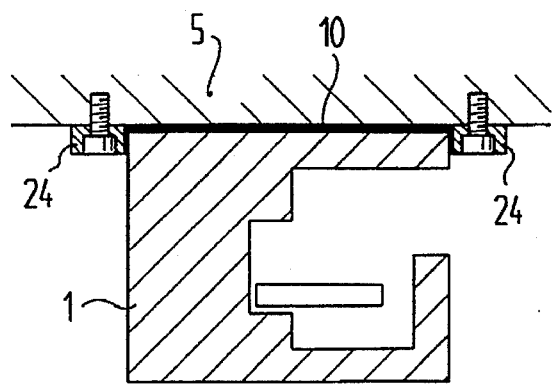
Figure 22:
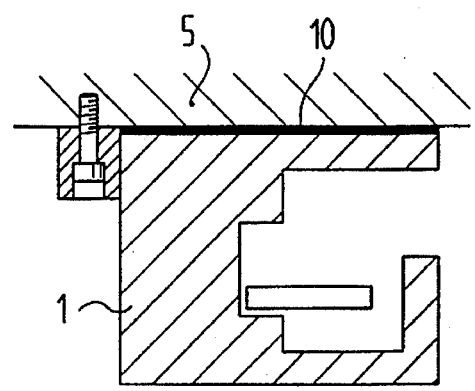

It is also within the scope of the invention to use individual pieces of rail separated from each other and embodied and fastened in accordance with the above described examples in place of rails 9, 9.1, 9.2, 9.3, 9.4 extending over the entire measuring length. Thus, there will be a plurality of rails or fastening elements which extend in the measuring direction which are spaced apart from each other. An example thereof is shown in FIGS. 17 and 18, wherein FIG. 18 illustrates a cross section of the linear measuring device of FIG. 17. Fastening of the linear measuring device takes place at both ends by means of one end piece 22 each. Groove 11 is cut into the face of end piece 22 facing carriage 5, into which fastening element 9.5 has been interlockingly glued. Fastening of fastening element 9.5 in end piece 22 may take place in the same way fastening of rail 9 in housing 1 was disclosed with respect to any of the embodiments shown in FIGS. 2–10. A translatory seating, free of force, of housing 1 in relation to fastening elements 9.5 rigidly fastened on carriage 5 is assured by the interposition of elastic adhesive layer 10 between fastening element 9.5 and end piece 22.

Figure 15:
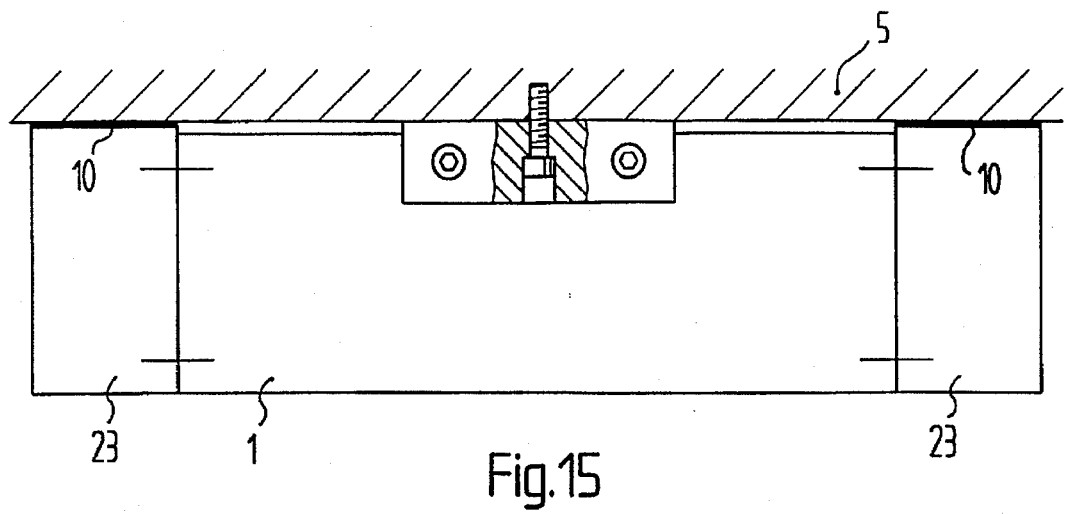
FIGS. 15 to 18 show various embodiments of end pieces to be used with a linear measuring device according to the present invention.
Figure 16:
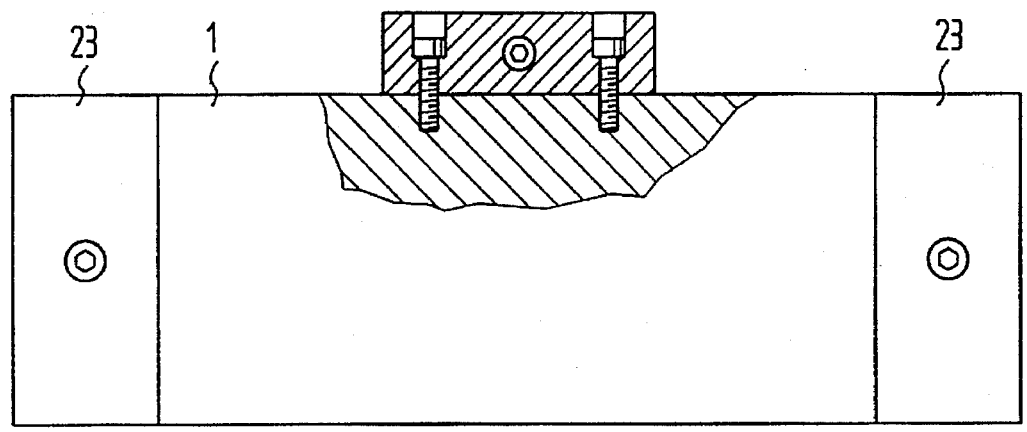

As shown in FIGS. 15 and 16, end pieces 23 can also be embodied in such a way that they can be directly fastened on carriage 5 via elastic adhesive layer 10. Elastic adhesive layer 10 is placed on one or more support areas of carriage 5 where housing 1 is supported on adhesive layer 10 at the support areas. As seen in FIG. 15, elastic adhesive layer 10 is positioned between each end piece 23 and carriage 5. Housing 1 is additionally rigidly fixed at approximately the center onto carriage 5.

To assure a translatory seating, free of force and friction-resistant, of housing 1, it is possible to fasten housing 1 itself via elastic adhesive layer 10 on carriage 5. In accordance with FIGS. 19 to 22, adhesive layer 10 has been directly applied to a surface of housing 1 for this purpose. The central fixation in place can be omitted, because with the elastic fastening the point of fixation is necessarily located in the center. Additional guide elements 24 can be provided for lateral guidance. Elastic adhesive layer 10 has also been inserted between guide elements 24 and housing 1 to prevent friction and lateral play.

Adhesive layers 10 need not be applied over the entire surface, in particular they can be provided in the form of strips spaced apart in the measuring direction. Adhesive layer 10 also remains highly elastic after drying, i.e. it is permanently elastic. When using casting compound 12, it must be assured that in every case adhesive layer 10 is more elastic than casting compound 12.

In a manner not illustrated, the invention can also be employed with open linear measuring devices. In this case, measuring representation 2 is then supported by a rail-shaped support body instead of housing 1.

The invention can also be realized if the groove is provided or placed in the rail or the rail pieces, with a corresponding projection on the housing.

With all embodiments in accordance with the invention the adhesive surface of the housing and/or the adhesive surface of the fastening elements can have indentations in accordance with German Patent Disclosure DE 89 11 313 U1. The indentations can also be embodied such that the adhesive layer interlockingly fills or encloses an undercut of a groove or a projection to prevent its detachment, as explained in European Patent Publication EP 0 465 966 A2, to whose contents express reference is made.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A position measuring device that measures the relative position of a first object and a second object, said position measuring device comprising:
   a support body having a scale located in a housing, wherein said support body is attached to said first object by a translatory seating;
   a scanning device that scans said scale along a measuring direction X, said scanning device is attached to said second object; and
   wherein said translatory seating comprises an elastic adhesive layer extending in the measuring direction (X) and positioned between said support body and said first object to provide translatory distance compensation between said support body and said first object.

2. The position measuring device of claim 1, wherein said support body has a plurality of end pieces and said elastic adhesive layer is positioned between at least one end piece of said support body and said first object.

3. The position measuring device of claim 1, further comprising a first fastening element that is rigidly fastened to said first object, said first fastening element is fastened to said support body with the interposition of said elastic adhesive layer.

4. The position measuring device of claim 2, further comprising a first fastening element that is rigidly fastened to said first object, said first fastening element is fastened to said support body with the interposition of said elastic adhesive layer.

5. The position measuring device of claim 3, wherein
said support body comprising a groove or a projection which extends in the measuring direction X; and
said elastic adhesive layer is placed between at least one surface of said groove or projection extending in the measuring direction X and a surface of said first fastening element so that said first fastening element is fastened with a degree of translatory freedom.

6. The position measuring device of claim 4, wherein
said support body comprising a groove or a projection which extends in the measuring direction X; and
said elastic adhesive layer is placed between at least one surface of said groove or projection extending in the measuring direction X and a surface of said first fastening element so that said first fastening element is fastened with a degree of translatory freedom.

7. The position measuring device of claim 3, wherein said first fastening element is a rail extending along the measuring direction X.

8. The position measuring device of claim 5, wherein said first fastening element is a rail extending along the measuring direction X.

9. The position measuring device of claim 3, wherein a second fastening element that extends in the measuring direction X and is spaced apart from said first fastening element is provided.

10. The position measuring device of claim 5, wherein a second fastening element that extends in the measuring direction X and is spaced apart from said first fastening element is provided.

11. The position measuring device of claim 5, wherein said groove or projection has an undercut.

12. The position measuring device of claim 6, wherein said groove or projection has an undercut.

13. The position measuring device of claim 5, wherein said first fastening element and a lateral surface of said groove or projection define a gap extending in the measuring direction X, said gap is filled with a relatively inelastically curing casting compound; and
said elastic layer is positioned between a surface of said first fastening element and said casting compound.

14. The position measuring device of claim 5, wherein said first fastening element and a lateral surface of said groove or projection define a gap extending in the measuring direction X, said gap is filled with a relatively inelastically curing casting compound; and
said elastic layer is positioned between a lateral surface of said groove or projection and said casting compound.

15. The position measuring device of claim 8, wherein said first fastening element and a lateral surface of said groove or projection define a gap extending in the measuring direction X, said gap is filled with a relatively inelastically curing casting compound; and
said elastic layer is positioned between a surface of said first fastening element and said casting compound.

16. The position measuring device of claim 8, wherein said first fastening element and a lateral surface of said groove or projection define a gap extending in the measuring direction X, said gap is filled with a relatively inelastically curing casting compound; and
said elastic layer is positioned between a lateral surface of said groove or projection and said casting compound.

17. The position measuring device of claim 11, wherein said first fastening element and a lateral surface of said groove or projection define a gap extending in the measuring direction X, said gap is filled with a relatively inelastically curing casting compound; and
said elastic layer is positioned between a surface of said first fastening element and said casting compound.

18. The position measuring device of claim 11, wherein said first fastening element and a lateral surface of said groove or projection define a gap extending in the measuring direction X, said gap is filled with a relatively inelastically curing casting compound; and
said elastic layer is positioned between a lateral surface of said groove or projection and said casting compound.

19. The position measuring device of claim 13, comprising an additional sliding layer provided between said elastic layer and said casting compound.

20. The position measuring device of claim 13, comprising a sliding layer provided between said elastic layer and said lateral surface of said groove or projection.

21. The position measuring device of claim 13, comprising a sliding layer provided between said elastic layer and said lateral surface of said fastening element.

22. The position measuring device of claim 17, wherein said gap is covered by a sealing element.

23. The position measuring device of claim 1, further comprising an elastic attachment device to fasten said scale to said support body.

24. The position measuring device in accordance with claim 23, wherein said elastic attachment device comprises an elastic adhesive layer interposed between said scale and said support body.

25. The position measuring device of claim 1, wherein said support body is additionally rigidly fastened to said first object at approximately its center.

26. The position measuring device of claim 1, wherein said support body comprises a housing with a hollow chamber to which said scale is fastened.

27. A position measuring device that measures the relative position of a first object and a second object, said position measuring device comprising:
a housing having a scale located in the housing, wherein said housing is attached to said first object by a translatory sealing;
a scanning device that scans said scale along a measuring direction X, said scanning device is attached to said second object, wherein said translatory sealing comprises an elastic adhesive layer extending in the measuring direction X and positioned between said housing and said first object to provide translatory distance compensation between said housing and said first object; and
a first fastening element that is rigidly fastened to said first object, said first fastening element is fastened to said housing with the interposition of said elastic adhesive layer.

28. The position measuring device of claim 27, further comprising an elastic attachment device to fasten the scale to said housing.

29. A position measuring device that measures the relative position of a first object and a second object, said position measuring device comprising:

a housing having a scale located in the housing, wherein said housing is attached to said first object by a translatory seating;

a scanning device that scans said scale along a measuring direction X, said scanning device is attached to said second object; and wherein said translatory seating comprises an elastic adhesive layer extending in the measuring direction (X) and positioned between said housing and said first object to provide translatory distance compensation between said housing and said first object.

30. The position measuring device of claim 29, wherein said housing has a plurality of end pieces and said elastic adhesive layer is positioned between at least one end piece of said housing and said first object.

* * * * *